(12) United States Patent
Drevet

(10) Patent No.: US 8,426,999 B2
(45) Date of Patent: Apr. 23, 2013

(54) ENERGY GENERATOR WITH MOVING DIAPHRAGM PLACED INSIDE DUCT

(76) Inventor: Jean Baptiste Drevet, Paris (FR)

( * ) Notice: Subject to any disclaimer, the term of this patent is extended or adjusted under 35 U.S.C. 154(b) by 185 days.

(21) Appl. No.: 13/057,003

(22) PCT Filed: Jul. 24, 2009

(86) PCT No.: PCT/FR2009/000920
§ 371 (c)(1),
(2), (4) Date: Feb. 1, 2011

(87) PCT Pub. No.: WO2010/012888
PCT Pub. Date: Feb. 4, 2010

(65) Prior Publication Data
US 2011/0133465 A1    Jun. 9, 2011

(30) Foreign Application Priority Data

Aug. 1, 2008  (FR) ...................................... 08 04388

(51) Int. Cl.
*F03B 13/12*    (2006.01)

(52) U.S. Cl.
USPC ............................................. 290/54; 290/43

(58) Field of Classification Search ............. 290/43, 290/44, 54, 55
See application file for complete search history.

(56) References Cited

U.S. PATENT DOCUMENTS

| | | | | |
|---|---|---|---|---|
| 5,167,483 A | * | 12/1992 | Gardiner | 415/3.1 |
| 7,863,768 B2 | * | 1/2011 | Filardo | 290/54 |
| 8,143,737 B2 | * | 3/2012 | Ortiz et al. | 290/54 |
| 2002/0146333 A1 | | 10/2002 | Drevet | |
| 2009/0302612 A1 | * | 12/2009 | Gartner | 290/54 |

FOREIGN PATENT DOCUMENTS

| | | |
|---|---|---|
| FR | 2891321 A1 | 3/2007 |
| FR | 2891322 A1 | 3/2007 |
| FR | 2893991 A1 | 6/2007 |
| WO | 82/00321 A1 | 2/1982 |

OTHER PUBLICATIONS

International Search Report, dated Oct. 27, 2010, from corresponding PCT application.

* cited by examiner

*Primary Examiner* — Tho D Ta
(74) *Attorney, Agent, or Firm* — Young & Thompson

(57) ABSTRACT

A generator for generating energy from a moving fluid, the generator including a duct of walls that include two faceplates (1) between which a diaphragm (5) is placed so as to be subjected to the action of a stream of fluid penetrating between the two faceplates, wherein the two faceplates diverge so as to cause the diaphragm to deform under the action of a stream of fluid in the form of a traveling wave that moves from a leading edge (6) of the diaphragm towards a trailing edge (7) of the diaphragm so that the trailing edge of the diaphragm is driven with transverse oscillating motion, elements (11, 12) for making use of the motion being coupled to the trailing edge.

15 Claims, 3 Drawing Sheets

ENERGY GENERATOR WITH MOVING DIAPHRAGM PLACED INSIDE DUCT

The invention relates to a generator for generating energy, such as electricity, from a moving fluid, such as an aerogenerator (or wind generator) or a water generator, i.e. a device capable of converting the energy of a moving fluid, into electrical energy, in particular.

BACKGROUND OF THE INVENTION

Various aerogenerators have been proposed. Most aerogenerators comprise a rotary propeller set into rotation by the wind and driving a device for producing electricity.

An aerogenerator is known, in particular from document WO 82/00321, that comprises a diaphragm placed between two faceplates forming an airflow duct between which a diaphragm is maintained under tension in a direction inscribed in the plane of the diaphragm and perpendicular to the direction of the stream of air so as to be subjected to transverse deformations under the action of the wind passing between the faceplates. The diaphragm is a fabric and includes battens that are placed along the two opposite edges of the diaphragm and that are attached to a support structure by ties. Under the action of the wind passing between the two faceplates, the diaphragm becomes the seat of transverse vibration, and the transverse movement of the central portion of the diaphragm is used for actuating a device for producing electricity.

OBJECT OF THE INVENTION

An object of the invention is to provide a diaphragm generator of improved efficiency.

BRIEF DESCRIPTION OF THE INVENTION

To achieve this object, the invention provides a generator for generating energy from a moving fluid, the generator comprising a duct of walls that include two faceplates between which a diaphragm is placed so as to be subjected to the action of a stream of fluid penetrating between the two faceplates, wherein the two faceplates diverge so as to cause the diaphragm to deform under the action of a stream of fluid in the form of a traveling wave that moves from a leading edge of the diaphragm towards a trailing edge of the diaphragm so that the trailing edge of the diaphragm is driven with transverse oscillating motion, means for making use of said motion being coupled to said trailing edge.

The action of the fluid as it advances amplifies the traveling wave, which moves from a leading edge of the diaphragm situated at the inlet of the duct towards a trailing edge of the diaphragm situated at the outlet of the duct, in such a manner that the trailing edge of the diaphragm is driven with transverse oscillating motion that actuates the means for making use thereof, which means are electricity production means, for example. The coupling between the fluid and the undulating diaphragm creates a pressure field that travels with the waves and a field of pressure force resultants that are applied to the diaphragm and that travel with the waves. The faceplates reinforce the forces that result from the pressure differentials. The mechanical energy of the fluid is transmitted to the diaphragm because of the work performed by the pressure forces as a function of the propagation speed of the waves, with this being accompanied by a reduction in the mean pressure of the fluid in the body of the wind generator. The wave propagation speed is modulated and optimized in order to maximize the recovery of energy from the fluid, with this being done by means for tensioning the diaphragm. The traveling waves correspond to mechanical energy, deformation energy, and kinetic energy traveling over the diaphragm. These waves reinforce one another mechanically as they travel as a result of mechanical energy being transferred from the fluid to the diaphragm, thereby leading to an increase in the amplitude of deformation, providing the mechanical characteristics of the diaphragm vary little along its length; the variation in amplitude may be smaller if the mechanical characteristics vary along the length of the diaphragm. The result of transferring energy from the fluid to the diaphragm is to be found in a pressure differential between the inlet and the outlet of the duct, with the power transmitted being the product of the pressure differential multiplied by the flow rate of the fluid. The pressure fields advancing on either side of the diaphragm connect the inlet pressure to the outlet pressure of the duct. At the trailing edge, the wave that reaches it has accumulated all of the mechanical energy that has been transferred from the fluid to the diaphragm along the path of the wave, and the trailing edge of the diaphragm actuates the means for producing electricity that serve to transform the mechanical energy into electrical energy.

This generator technology provides various advantages such as a high level of airflow or water flow efficiency, better instantaneous operating efficiency, even at a low fluid flow rate, because it presents good occlusivity regardless of flow rate. The generator also provides better efficiency over a duration of utilization because of its small inertia and its short response time that enable it to recover energy from the stream of fluid even if its speed is slow, and to adapt to high wind speeds, and to follow speed variations during gusts.

DETAILED DESCRIPTION OF THE INVENTION

The electricity generator of the invention is arranged to produce electricity from a moving fluid. In the description below, the fluid under consideration is air, such that the generator described is an aerogenerator. Nevertheless, it goes without saying that the invention applies to generators producing electricity from other fluids, and for example from water.

The principle of the invention is explained with reference to FIG. 1.

Figure 1:
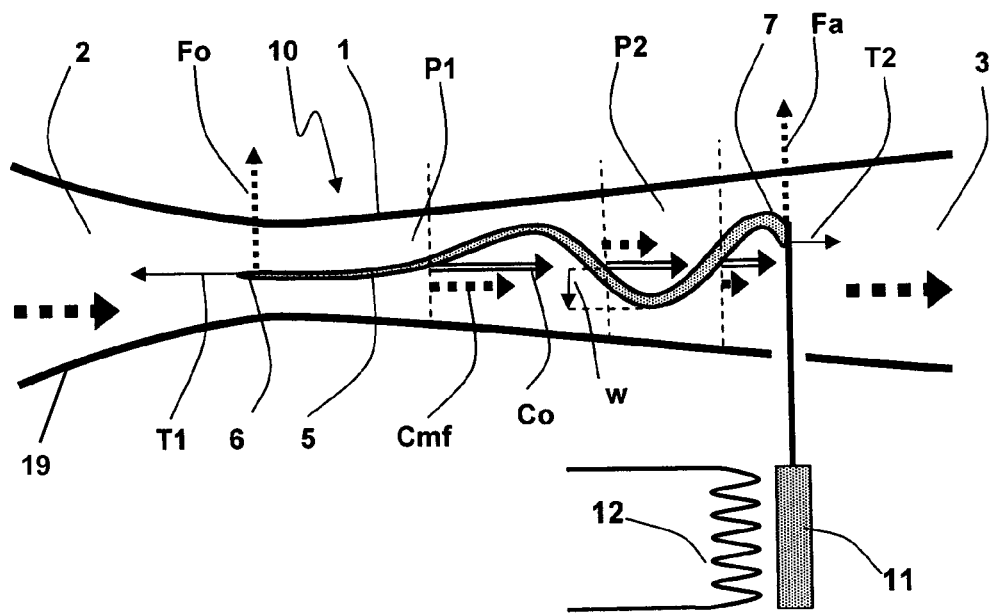
FIG. 1 is a diagrammatic longitudinal section view of an aerogenerator in accordance with the principle of the invention.

With reference to FIG. 1, the generator in accordance with the invention comprises an undulating diaphragm 5 placed in a body 10 of the generator that defines a duct for a stream of air between an inlet 2 and an outlet 3 of the body 10 of the generator.

The diaphragm 5 has a leading edge 6 and a trailing edge 7, respectively at the inlet 2 and the outlet 3 of the body 10. The trailing edge 7 is connected to a device for producing electricity.

The leading edge 6 of the diaphragm 5 is subjected to tension T1 and the trailing edge 7 is subjected to tension T2 such that the diaphragm undulates under the effect of a stream of air flowing along the passage. The tensions T1 and T2 are determined as a function of the propagation speed desired for waves in the diaphragm 5, with the difference in the tension values determining the resistance of the diaphragm to the air stream as results from the pressure forces projected onto the longitudinal axis parallel to the wind direction.

The diaphragm 5 is placed in a diverging portion of the body 10. This portion is shaped to match the amplitude envelope of the waves as they travel. The mechanical characteristics of the diaphragm contributes to the propagation speed of the wave always being slower than the speed of the fluid passing through the body.

The generator of the invention is described in greater detail below.

Figure 2:
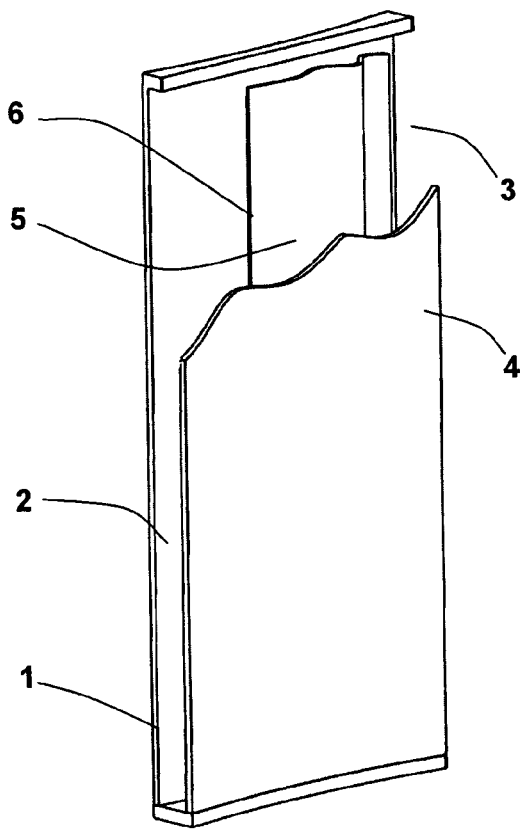
FIG. 2 is a cutaway perspective view of an aerogenerator in a first particular embodiment of the invention.

The generator shown in FIG. 2 comprises a body 10 having two vertical faceplates 1 disposed facing each other so as to diverge from an inlet 2 of the generator towards an outlet 3 of the generator. The faceplates 1 thus define a duct, and they have edges that extend between the inlet 2 and the outlet 3, and they are connected together by walls.

Between the faceplates 1, there extends a diaphragm 5 that has a leading edge 6 beside the inlet 2 of the generator and a trailing edge 7 beside the outlet 3 of the generator. In this example, the diaphragm 5 is considered as being a sheet of material that is deformable at least in bending about a vertical axis. It may be a fabric, composite materials, or indeed an elastomer. The tensioning means symbolized by arrows 8 in FIG. 2 act on the leading and trailing edges 6 and 7 of the diaphragm 5 to keep it under tension in a vertical plane. Under the action of wind channeled by the faceplates 1, the diaphragm 5 starts oscillating and becomes the seat of a traveling wave that propagates along the diaphragm between its leading edge 6 and trailing edge 7. Although the transverse movement at the leading edge 6 (represented by the double-headed arrow) remains relatively small, the transverse movement at the trailing edge 7 is large and suitable for actuating electricity production means. The trailing edge 7 is connected to a core 11 having permanent magnets and serves to move said core 11 inside a coil 12, thereby having the effect of producing electricity at the terminals of the coil 12.

Figure 3:
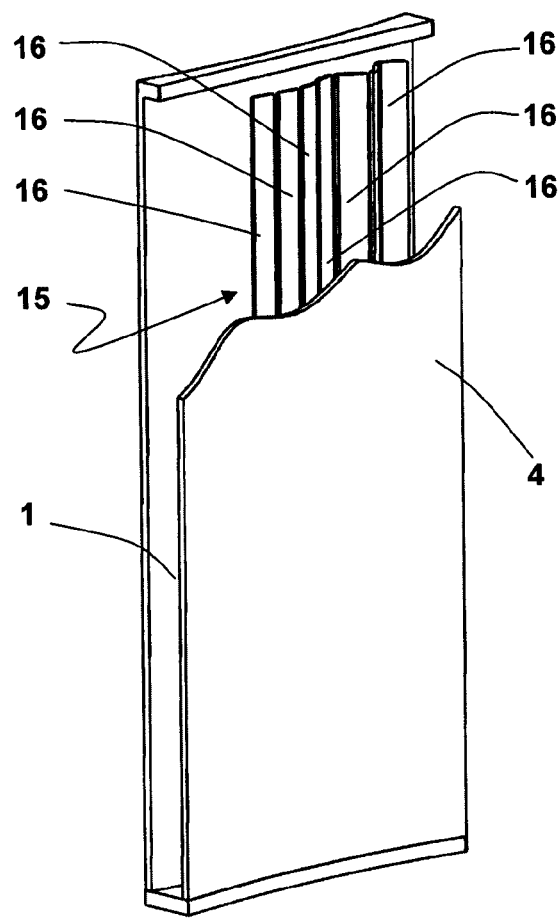
FIG. 3 is a cutaway perspective view of an aerogenerator in a second particular embodiment of the invention.

The generator shown in FIG. 3 is similar to that shown in FIGS. 1 and 2, except that the diaphragm 15 in this example is constituted by slats 16 that are hinged to one another about vertical axes. The diaphragm 15 behaves overall like the diaphragm 5 and conveys a traveling wave that moves from the leading edge to the trailing edge of the diaphragm.

Figure 4:
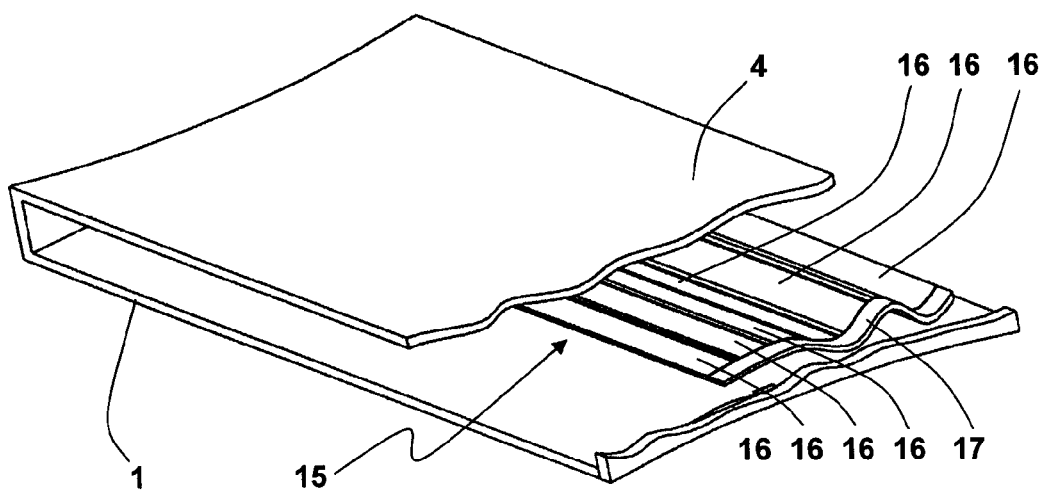
FIG. 4 is an exploded perspective view of a variant of the second particular embodiment of the invention.

The generator shown in FIG. 4 is similar to that shown in FIG. 3, except that the diaphragm 15 is made up of slats 16 that are fastened to a deformable structure, here an elastic element suitable for conveying traveling waves generated by the stream of air. The characteristics of the elastic element may advantageously vary along the working length of the diaphragm so as to optimize the propagation speed of the waves relative to the stream of air. The elastic element thus carries attachment points for applying the tension and for coupling to the electricity generator. The elastic element in this example is made up of two battens 17 having the ends of the slats 16 engaged therein.

Figure 5:
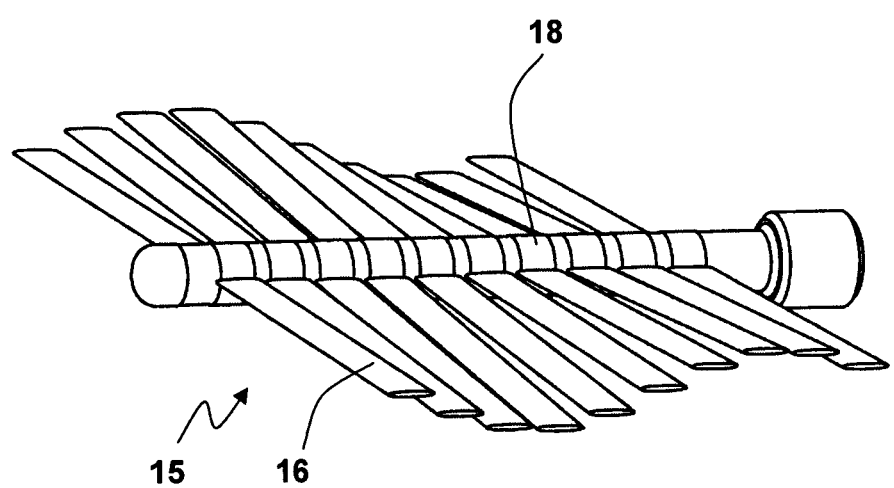
FIG. 5 is an exploded perspective view of an aerogenerator in a third particular embodiment of the invention.

In the generator shown in FIG. 5, the slats 16 are fastened in their centers to the elastic element that, in this example, is formed by an elastic torsion bar 18 that is the seat of traveling waves in the form of an angular oscillating motion such that the oscillation amplitude of the traveling wave is an angular amplitude.

The characteristics of the elastic torsion bar 18 may also vary along the working length of the diaphragm. In this example, the generator transforms into electrical energy the product of the torque multiplied by the angular speed of the torsion bar 18.

The invention is not limited to the above description, but on the contrary covers any variant coming within the ambit defined by the claims.

The generator may operate vertically as shown, but it may also operate horizontally.

In particular, in the embodiments shown, provision may be made to equip the generator with a pulse actuator that is coupled to the leading edge of the diaphragm and that has the function of initiating undulating motion of the diaphragm, thereby making it easier to establish traveling wave conditions when the diaphragm is subjected to the action of the stream of fluid.

The diaphragm may have various structures and it may be constituted by a sheet of a material that is optionally elastically deformable, by a plurality of slats that are hinged directly to one another or that are fastened together by a structure that is deformable, optionally elastically, . . . .

The electricity production means may be replaced by other means for making use of the motion of the diaphragm, such as mechanical means.

It is possible to add deflectors upstream and/or downstream of the duct in order to act on the hydraulic or air-flow power delivered by the fluid, in particular in order to increase the pressure difference between the inlet and the outlet of the duct. For example, a deflector 19 (shown in FIG. 1) may be mounted at the duct inlet to increase the quantity of fluid that engages in the duct.

The invention claimed is:

1. A generator for generating energy from a moving fluid, the generator comprising a duct and a diaphragm (5, 15) placed inside said duct, said duct comprising walls including two faceplates (1) between which the diaphragm (5; 15) is placed so as to be subjected to the action of a stream of fluid penetrating between the two faceplates, wherein the two faceplates diverge from an inlet (2) of the duct towards an outlet (3) of the duct so as to cause the diaphragm to deform under the action of a stream of fluid in the form of a traveling wave that moves from a leading edge (6) of the diaphragm situated at the inlet (2) of the duct towards a trailing edge (7) of the diaphragm situated at the outlet (3) of the duct so that the trailing edge of the diaphragm is driven with transverse oscillating motion, and means (11, 12) for making use of said motion being coupled to said trailing edge.

2. The generator according to claim 1, wherein the diaphragm (5) is constituted by a sheet of elastically deformable material.

3. The generator according to claim 1, wherein the diaphragm (15) comprises a plurality of slats (16) that are hinged to one another.

4. The generator according to claim 1, including a deflector (19) mounted upstream and/or downstream of the duct in order to increase the power delivered by the fluid.

5. The generator according to claim 1, wherein the diaphragm (15) comprises a plurality of slats (16) that are fastened to a deformable structure that is the seat of a traveling wave.

6. The generator according to claim 5, wherein the deformable structure is elastic.

7. The generator according to claim 5, wherein the deformable structure oscillates about an axis.

8. The generator according to claim 1, wherein the diaphragm (5) is constituted by a sheet of deformable material.

9. The generator according to claim 8, wherein the diaphragm (15) comprises a plurality of slats (16) hinged to one another along a longest dimension of the slats (16), the longest dimension running transverse to the direction of the moving fluid.

10. The generator according to claim 8, wherein the diaphragm (15) comprises an elastic torsion bar (18) extending from the inlet to the outlet of the duct, and a plurality of slats (16) connected to the torsion bar (18).

11. The generator according to claim 8, further comprising a deflector (19) mounted upstream of the inlet (2) of the duct, the deflector (19) shaped to increase a power delivered by the moving fluid.

12. A generator for generating energy from a moving fluid, the generator comprising:
- a duct (10) comprised of two opposite faceplates (1) that diverge from an inlet (2) of the duct towards an outlet (3) of the duct;
- a diaphragm (5, 15) placed in inside the duct between the two faceplates (1) within a diverging portion of the duct, a leading edge (6) of the diaphragm being situated at the inlet (2) of the duct and a trailing edge (7) of the diaphragm situated at the outlet (3) of the duct,
wherein with the moving fluid, moving from the inlet (2) to the outlet (3) of the duct, the diaphragm (5, 15) is subjected to action of a stream of the fluid penetrating between the two faceplates so as to cause the diaphragm (5, 15) to deform under the action of the stream of fluid in the form of a traveling wave that moves from the leading edge (6) of the diaphragm towards a trailing edge (7) of the diaphragm so that the trailing edge (7) of the diaphragm (5, 15) is driven with transverse oscillating motion; and
- an electric power generating element (11, 12) connected to the trailing edge (7) of the diaphragm (5, 15) so that when the trailing edge (7) of the diaphragm is driven with transverse oscillating motion, the electric power generating element (11, 12) generates electricity.

13. The generator of claim 12, wherein,
the diaphragm is an undulating diaphragm, and
undulating the moving fluid is air.

14. The generator of claim 12, wherein,
the diaphragm is an undulating diaphragm, and
the moving fluid is water.

15. The generator of claim 12, wherein, with the moving fluid, moving from the inlet (2) to the outlet (3) of the duct, the leading edge (6) of the diaphragm (5) is subjected to a first tension (T1) and the trailing edge (7) of the diaphragm (5) is subjected to an opposite second tension (T2) such that the diaphragm undulates under the effect of the stream of air flowing along the passage, the first and second tensions (T1, T2) being determined as a function of a propagation speed of the traveling wave in the diaphragm (5), with a difference between values of the first and second tensions (T1, T2) determining a resistance of the diaphragm (5) to the air stream resulting from pressure forces projected onto a longitudinal axis parallel to the moving fluid direction.

* * * * *

UNITED STATES PATENT AND TRADEMARK OFFICE
CERTIFICATE OF CORRECTION

PATENT NO.       : 8,426,999 B2
APPLICATION NO.  : 13/057003
DATED            : April 23, 2013
INVENTOR(S)      : Jean Baptiste Drevet It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this
Eighth Day of September, 2015

Michelle K. Lee
*Director of the United States Patent and Trademark Office*